United States Patent

Dimitri et al.

Patent Number: 6,038,490
Date of Patent: Mar. 14, 2000

[54] AUTOMATED DATA STORAGE LIBRARY DUAL PICKER INTERFERENCE AVOIDANCE

[75] Inventors: Kamal Emile Dimitri; Frank David Gallo; John Edward Kulakowski; Rodney Jerome Means; Jesse Lee Thrall; Daniel James Winarski, all of Tucson, Ariz.

[73] Assignee: International Business Machines Corporation, Armonk, N.Y.

[21] Appl. No.: 09/015,272

[22] Filed: Jan. 29, 1998

[51] Int. Cl.$^7$ .................................................. G06F 17/00
[52] U.S. Cl. ...................... 700/214; 700/218; 360/98.04; 360/98.05; 369/36; 369/34
[58] Field of Search ........................ 364/478.02, 478.03, 364/478.06; 360/95, 98.04, 98.05, 99.02; 369/36, 34, 33

[56] References Cited

U.S. PATENT DOCUMENTS

| | | | |
|---|---|---|---|
| 3,831,197 | 8/1974 | Beach et al. ............................. | 360/71 |
| 5,128,912 | 7/1992 | Hug et al. ............................... | 369/38 |
| 5,291,001 | 3/1994 | Krayer et al. .......................... | 235/375 |
| 5,293,284 | 3/1994 | Sato et al. ............................. | 360/98.04 |
| 5,513,156 | 4/1996 | Hanaoka et al. ...................... | 369/34 |
| 5,522,090 | 5/1996 | Tanaka et al. ........................ | 395/894 |
| 5,546,366 | 8/1996 | Dang ...................................... | 369/36 |
| 5,570,337 | 10/1996 | Dang .................................... | 369/192 |
| 5,867,003 | 2/1999 | Hashimoto et al. .................. | 364/478.02 |

FOREIGN PATENT DOCUMENTS 162248  11/1985  European Pat. Off. .

Primary Examiner—Christopher P. Ellis
Assistant Examiner—Khoi H. Tran
Attorney, Agent, or Firm—Robert M. Sullivan; John H. Holcombe

[57] ABSTRACT

Disclosed are an automated data storage library and a method for operating the library. The library includes two pickers arranged on a common guideway; a plurality of media storage slots arranged in a plurality of regions alongside the guideway; a plurality of read/write stations arranged in regions alongside the guideway. Commands are received for jobs to move media amongst the storage slots and the read/write stations, and a controller queues the received commands and allocates the queued commands to the pickers and in an order of jobs which will allow the pickers to independently access and move the media so as to avoid interference in the same region, or in regions which are behind the other picker. The media storage slots may be arranged in row sets and regions alongside the guideway, each row set including one or more storage slots and each region including one or more columns, with the regions narrower than the pickers. The controller queues the received commands and allocates the queued commands to the pickers and in an order of jobs so as to allow the pickers to independently access and move the media to avoid interference in the same row set in adjacent regions, in the same region, or in regions which are behind the other picker.

14 Claims, 6 Drawing Sheets

COLLISION AVOIDANCE THROUGH JOB-QUEUE MANAGEMENT

| QUEUE | JOB TYPE | PRIORITY | PICKER | DRIVE REGION | BIN REGION | GARAGE REGION |
|---|---|---|---|---|---|---|
| JOB-1 | MOVE | 0 | P2 | R5 ← | R4 | |
| JOB-2 | MOVE | 0 | P2 | R4 ← | R4 | |
| JOB-3 | EXCH | 0 | | R5 ← | R5 | |
| | | | | R5 → | R5 | |
| JOB-4 | MOVE | 0 | | | R4 → | G2 |
| JOB-5 | MOVE | 0 | P1 | R1 ← | R2 | |
| JOB-6 | EXCH | 0 | | R1 ← | R5 | |
| | | | | R1 → | R5 | |

FIG. 7

COLLISION AVOIDANCE THROUGH JOB-QUEUE MANAGEMENT WITH DELAY

| QUEUE | JOB TYPE | PRIORITY | PICKER | DRIVE REGION | BIN REGION | GARAGE REGION |
|---|---|---|---|---|---|---|
| JOB-1 | EXCH | 0 | P2 | R3 ← | R4 | |
| | | | | R3 → | R4 | |
| JOB-2 | MOVE | 0 | P2 | R4 ← | R4 | |
| JOB-3 | MOVE | 0 | P1 | R3 ← | R2 | |
| JOB-4 | MOVE | 0 | | | R5 → | G2 |
| JOB-5 | EXCH | 0 | P1 | R1 ← | R2 | |
| | | | | R1 → | R2 | |
| JOB-6 | EXCH | 0 | | R1 ← | R5 | |
| | | | | R1 → | R2 | |

FIG. 8A

COLLISION AVOIDANCE THROUGH JOB-QUEUE MANAGEMENT WITH DELAY AND PRIORITY

| QUEUE | JOB TYPE | PRIORITY | PICKER | DRIVE REGION | BIN REGION | GARAGE REGION |
|---|---|---|---|---|---|---|
| JOB-1 | EXCH | 0 | P2 | R3 ← | R4 | |
| | | | | R3 → | R4 | |
| JOB-2 | MOVE | 0 | P2 | R4 ← | R4 | |
| JOB-3 | MOVE | 0 | P1 | R3 ← | R2 | |
| JOB-4 | MOVE | 0 | | | R5 → | G2 |
| JOB-5 | EXCH | 0 | P1 | R1 ← | R2 | |
| | | | | R1 → | R2 | |
| JOB-6 | EXCH | 1 | | R1 ← | R5 | |
| | | | | R1 → | R2 | |

FIG. 8B

| CARTRIDGE/VOLUME SERIAL NUMBERS | STORAGE SLOT X-Y LOCATIONS | |
|---|---|---|
| . . . . . . . . . . . . . . . . . . . . . . . . . . . . . . | . . . . . . . . . . . . . . . . . . . . . . . . . . . . . . | ⟵ 70 |
| CARTRIDGE/VOLUME SERIAL NUMBERS | LIBRARY LOCATIONS | |
| DRIVE 1 | X – Y | |
| . . . . . | . . . . . | |
| . . . . . | . . . . . | } 71 |
| DRIVE N | X – Y | |
| PICKER 1 | CURRENT X-Y | } 72 |
| PICKER 2 | CURRENT X-Y | |
| CARTRIDGE/VOLUME SERIAL NUMBERS | INPUT/OUTPUT SLOT X-Y LOCATIONS | |
| . . . . . | . . . . . | ⟵ 73 |

AUTOMATED DATA STORAGE LIBRARY DUAL PICKER INTERFERENCE AVOIDANCE

TECHNICAL FIELD

This invention relates to automated data storage libraries for storing media in a plurality of storage slots, and, more particularly, to automated data storage libraries having a plurality of pickers for independently accessing the plurality of storage slots.

BACKGROUND OF THE INVENTION

Larger data processing systems typically include a plurality of host processors and typically require storage for large numbers of data storage media. The data storage media are typically optical disks or magnetic tapes which are stored in a library having a plurality of storage slots, and which can be accessed by a picker. The storage slots may be arranged in rows, and the rows are arranged in columns. The conventional picker is a robotic device which moves along a guideway in a horizontal motion, or about a pivot in a rotary motion, and moves vertically to access the various storage slots. Commands received from the host(s) are often queued to permit the receipt of additional commands during the execution of the previous command so that the processing speed of the system is increased. Additionally, two pickers may be provided and may be operated simultaneously to increase the speed of the system. An example of a library having queuing and two pickers is illustrated in U.S. Pat. No. 5,513,156, Hanaoka et al., issued Apr. 4, 1996.

The difficulty is that each of the pickers is limited to access only one section of the library at the same time, and no picker is allowed to access the same storage slot as another picker. Thus, if all of the required data storage media is stored in one section of the library, only one picker may be utilized to access the media at a time. The reason for the limitation is the probability of interference between the pickers. An added complication results if the pickers are wider than a single column, requiring a separation or added clearance between the two fixed sections of the library.

SUMMARY OF THE INVENTION

An object of the present invention is to allow dual pickers to access the same storage slots, while avoiding interference between the pickers, even though mounted on the same guideway.

Disclosed are an automated data storage library and a method for operating the library. The library includes two pickers arranged on a common guideway; a plurality of media storage slots arranged in a plurality of regions alongside the guideway; a plurality of read/write stations arranged in a plurality of regions alongside the guideway; an input for receiving input commands for jobs to move media amongst the storage slots and the read/write stations; and a controller for queuing the received input commands and allocating the queued commands to the pickers and in an order of jobs which will allow the pickers to independently access and move the media so as to avoid interference in the same region, or in regions which are behind (on the opposite side of) the other picker, with respect to each picker.

The media storage slots may be arranged in row sets and regions alongside the guideway, each row set including one or more rows of storage slots and each region including one or more columns, with the pickers typically wider than the regions. The controller queues the received input commands and allocates the queued commands to the pickers and in an order of jobs which will allow the pickers to independently access and move the media so as to avoid interference in the same row set in adjacent regions, in the same region, or in regions which are behind the other picker, with respect to each picker.

The controller may additionally move one picker out of any row or region to be occupied by the other picker during execution of the next command for the other picker.

For a fuller understanding of the present invention, reference should be made to the following detailed description taken in conjunction with the accompanying drawings.

BRIEF DESCRIPTION OF THE DRAWINGS

FIGS. 7, 8A and 8B are tables illustrating examples of the operation of the automated data storage library of FIG. 1;

DETAILED DESCRIPTION OF THE INVENTION

Figure 1:
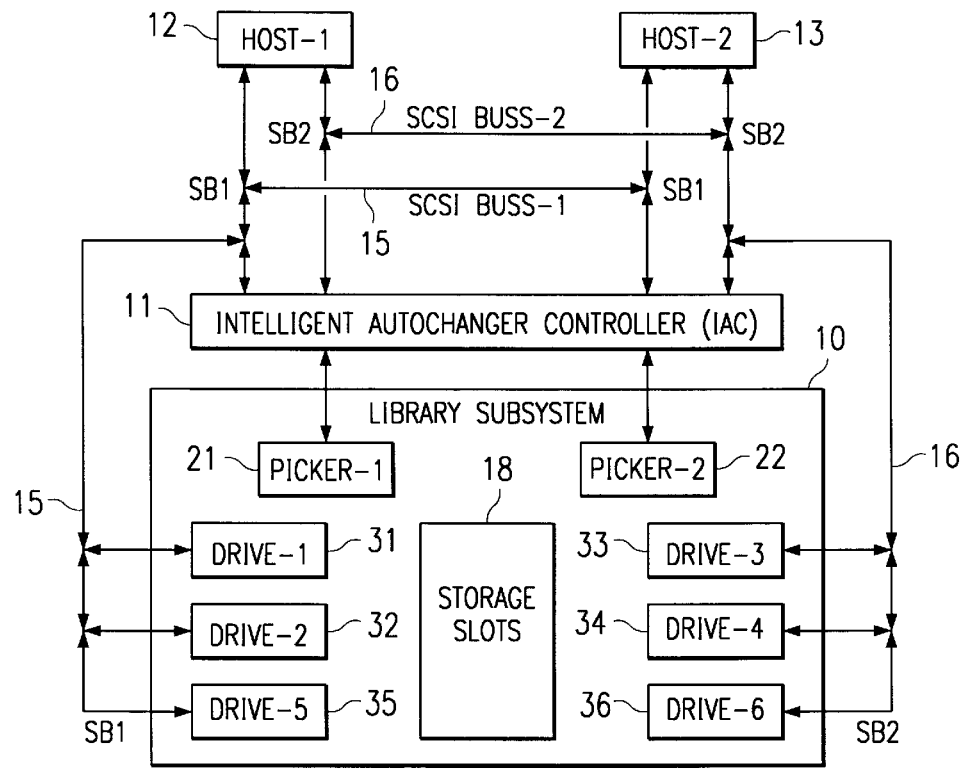
FIG. 1 is a block diagram of an automated data storage library of the present invention.

Referring to FIG. 1, an automated data storage library 10 and library controller 11 are illustrated in block diagram form. The library is shown connected to two host data processing systems 12 and 13 over busses 15 and 16. For example, the hosts may comprise AS/400 or RISC SYSTEM 6000 data processors supplied by IBM. The busses 15 and 16 may comprise any suitable bus communication path or paths between the host data processing systems 12 and 13 and the automated data storage library 10 and controller 11. One example comprises the small computer systems interface (SCSI) which is defined by various standards and is well known in the industry.

The library 10 stores a plurality of data storage media in storage slots 18. Two pickers 21 and 22, under the control of controller 11 may access the data storage media from storage slots 18 and supply them to any of data storage drives 31–36. In the illustrated embodiment, host processor 12 is directly connected to drives 31, 32 and 35, and host processor 13 is directly connected to drives 33, 34 and 36. This allows maximum data transfer rates between drives and associated hosts. The SCSI busses 15 and 16 also allow alternate pathing from the hosts to the other drives. The host processors issue commands to the drives to search for, and to read and/or write data on the data storage media, and supply or receive the data with respect to the associated drive.

Figure 2:
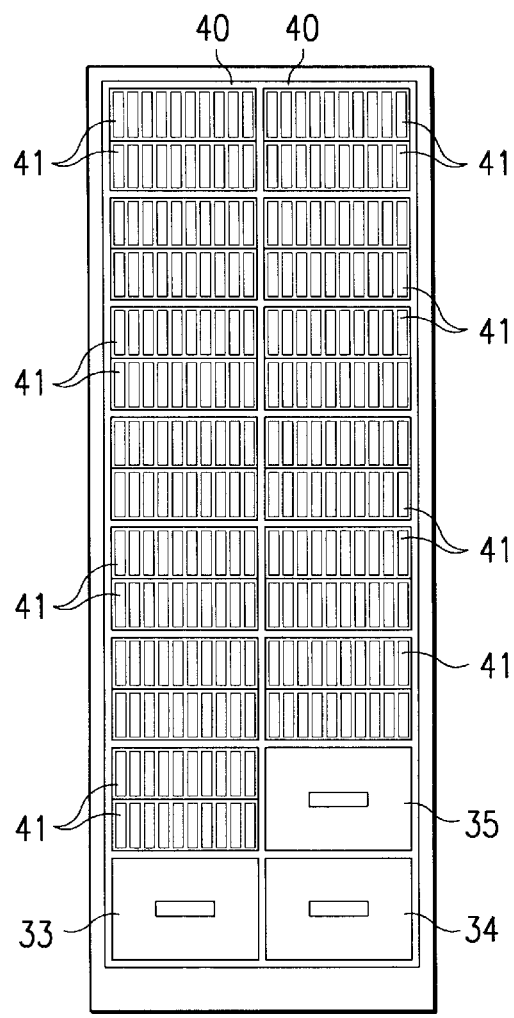
FIG. 2 is an illustration of two regions of the automated data storage library of FIG. 1.

FIG. 2 illustrates two regions 40 of data storage slots which store data storage media 41, and data storage drive 33 in one region and two data storage drives 34 and 35 in another region. To illustrate the present invention, each region 40 of the data storage library comprises a plurality of rows of vertical storage slots, each slot comprising a column. The pickers 21 and 22 are wider than a single region 40, thus extending into the adjacent region when in one region. In an alternative embodiment the regions may be sufficiently wide that the pickers 21 and 22 do not extend into an adjacent region when in one region.

Typically, the data storage media 41 are self-contained within a portable container, or cartridge. Examples of such data storage media include magnetic tape cartridges or cassettes, optical disk cartridges of various types, including ROM, WORM and rewritable, and in various formats. For universal reference to any of these types of media, the terms "data storage media" or "media" are used herein.

Figure 3A:
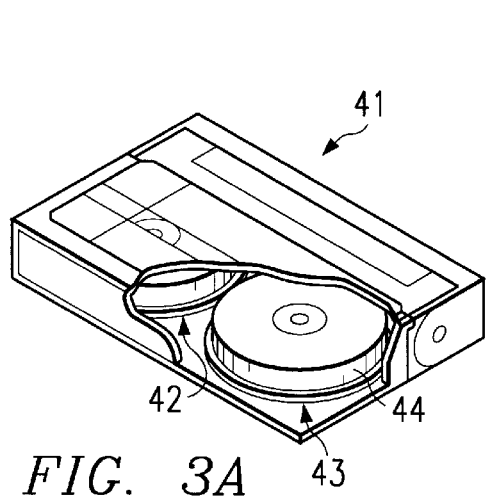
FIGS. 3A and 3B are illustrations of one type of data storage media which may be stored in the automated data storage library of FIG. 1.
Figure 3B:
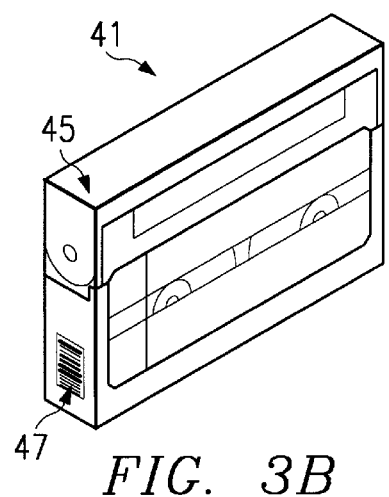

An example of one type of media, a typical tape cassette 41, is illustrated in FIGS. 3A and 3B. The typical cassette has two reels 42 and 43 on which is wound a tape 44. A cover 45 protects the tape while the cassette is being stored and transported, and the read/write data storage (tape) drive 31–36 of FIG. 1 opens the cover 45 during loading to gain access to the tape for reading and/or writing thereon.

A bar code 47 may be provided on an edge of the cassette for identification of the cassette by bar code reader mounted on the pickers 21 and 22 of FIG. 1.

Referring to FIGS. 1, 3A and 3B, when the tape cassette 41 is accessed and transported to a read/write tape drive 31–36, the tape 44 is positioned at the "beginning of tape", or BOT. The host will typically command the operation of the tape drive to search for particular data to read or a particular location on the tape at which to write, and read or write data at that location. BOT is the location on the tape where the "volume serial number" (VOLSER) for the cassette is recorded, along with other control information for this volume. This data is used to verify the correct tape is being accessed, and to determine the block size and blocking factor used for this volume. BOT may be located at one end of the tape so that the tape is wound primarily on one of the reels of the cassette for storage. Alternatively, the BOT may be located at a midpoint of the tape so that the seek distance to a desired location is likely to be shorter.

The typical read/write tape drive 31–36 will reel the tape 44 while searching for the desired data to read or the desired location at which to begin writing. Upon locating the desired data or location, the tape drive will conduct the read and/or write operation. Upon completion of reading and/or writing, the tape 44 will most likely be displaced a considerable distance from the BOT, and the tape must be rewound from it's position at the completion of reading and /or writing to the BOT. A rewind command from a library manager would normally operate the read/write tape drive control to rewind the tape to BOT.

The tape cassette 41 may then be returned to the original storage slot, or, more likely, will be exchanged for the next media accessed by the picker 21 or 22. This is accomplished in the typical data storage library by the use of dual gripper pickers, which may simultaneously grip two separate cassettes.

Figure 4:
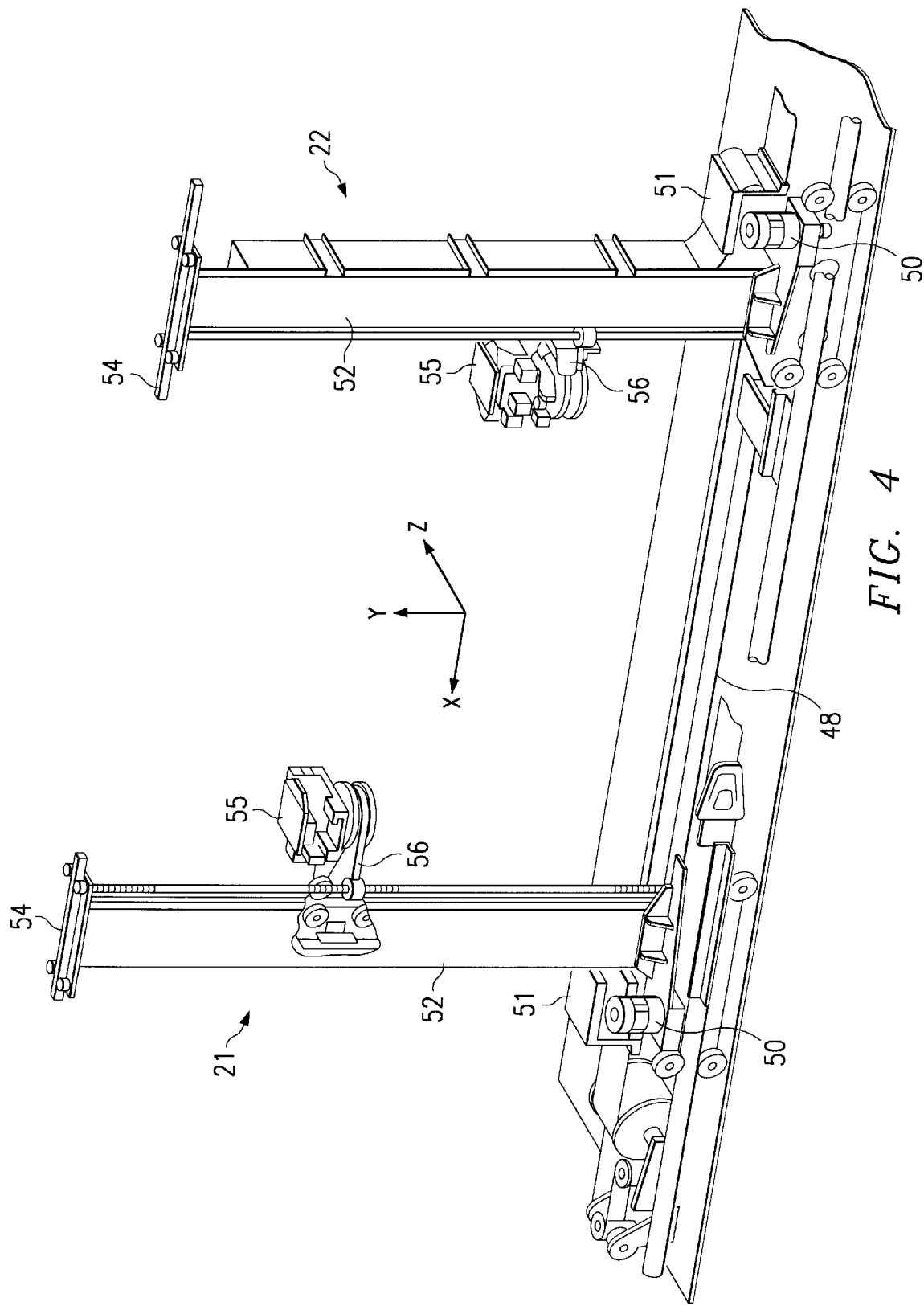
FIG. 4 is an illustration of two pickers mounted on the same guideway of the automated data storage library of FIG. 1.

Exemplary pickers in accordance with one embodiment of the present invention are illustrated in FIG. 4. A picker 21 or 22 is a robotic device which accesses the data storage media from the storage slots and delivers the accessed media to data storage drives for reading and/or writing data on the accessed media and returns the media to the storage slots. The pickers 21 and 22 run on a single rail 48 along the library aisle driven by motors 50 in carriages 51. A pillar 52 is vertically attached to each of the running sections 51 of the pickers and rides in a single top rail 54 to provide vertical stability. Robotic manipulators 55 are mounted on carriages 56 which can move vertically along the pillars 52.

In the embodiment illustrated in FIGS. 1 and 4, each of the robotic manipulators 55 includes two grippers for accessing and supporting two data storage media.

The two grippers on a picker can be used to exchange (or swap) data storage media at either a data storage drive or at a storage slot. In the first case, the first picker is moved to the first storage slot, then the first gripper on the first picker removes the first data storage medium from the first storage slot. Next, the first picker transports the first data medium to the first data storage drive, then, at the first data storage drive, the second gripper on the first picker removes the second data storage medium from the first data storage drive, and then the first gripper on the first picker inserts the first data storage medium into the first data storage drive. Next, the first picker transports the second data storage medium to the second storage slot, then the second gripper on the first picker inserts the second data storage medium in the second storage slot, thus effecting the exchange of the media in a data storage drive.

In the second case, the first picker is moved to the first data storage drive, then the first gripper on the first picker removes the first data storage medium from the first data storage drive, and then the first picker transports the first data medium to the first storage slot. Next, at the first storage slot, the second gripper on the first picker removes the second data storage medium from the first storage slot, then the first gripper on the first picker inserts the first data storage medium into the first storage slot, and then the first picker transports the second data storage medium to the second data storage drive. Next, the second gripper on the first picker inserts the second data storage medium in the second data storage drive, thus effecting the exchange of the media in a storage slot.

Examples of automated data storage libraries are the IBM 3494 Data Storage Library, which stores magnetic tape cartridges, the IBM 3575 Data Storage Library, which stores magnetic tape cassettes 41, the IBM 3995 Data Storage Library, which stores optical disk cartridges, or the IBM 3850 Mass Storage Subsystem, with dual pickers.

Figure 5:
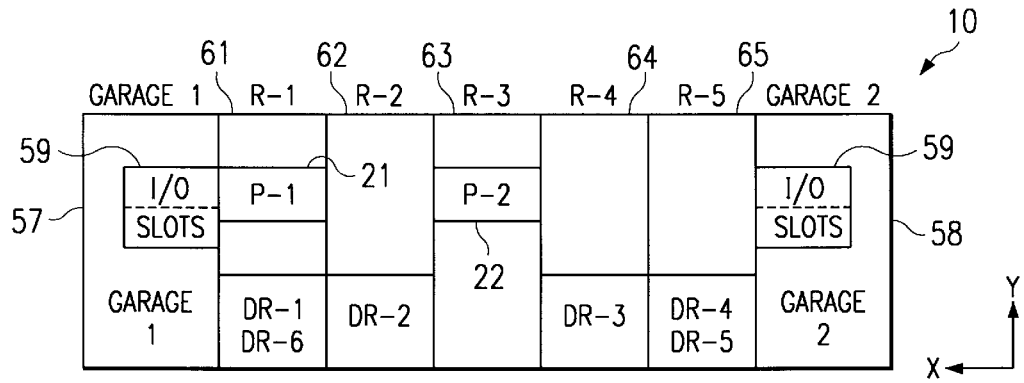
FIGS. 5 and 6 are diagrammatic representations of the automated data storage library of FIG. 1.
Figure 6:
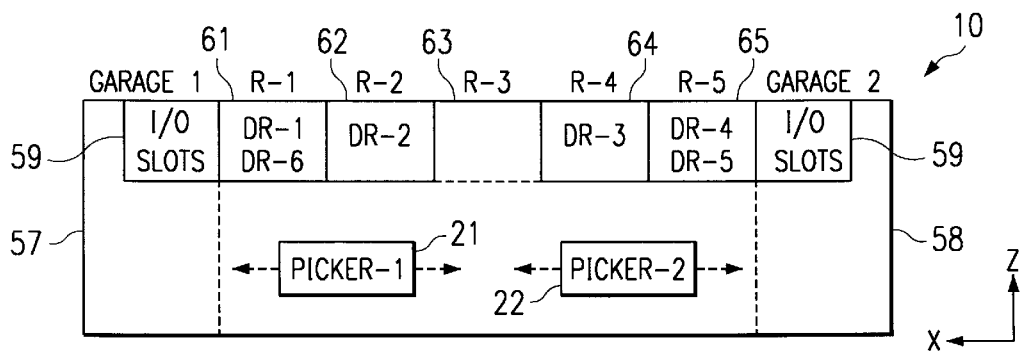

FIGS. 5 and 6 illustrate, respectively, front and top views of one embodiment of a library in accordance with the present invention. The library incorporates the elements of library 10 of FIG. 1. There are separate garages 57 and 58 on each side of the library, one for each picker. Each garage may have an input/output station and special slots 59, for allowing insertion of data storage media from outside the library and for storage of special purpose media, such as cleaning cartridges. Each region 61–65 has a plurality of data storage slots arranged in rows. The garage can be used as storage for a picker (e.g., as it is repaired or updated) and, if it has an input/output station 59, can also be considered as a region, although preferably it has no storage slots or data storage drives since the other picker cannot reach into the garage area. The garage region may be wider than a storage slot region. The data storage drives are preferably intermingled among the regions, so that some of the primary drives for each host are on each side of the library. For example, region R-1 61 has two drives, DR-1 31 (connected via SCSI bus SB-1 15 to host 12) and DR-6 36 (connected via SCSI bus SB-2 16 to host 13). Region R-2 62 has one drive, DR-2 32 (connected via SCSI bus SB-1 15 to host 12). Region R-4 64 has one drive, DR-3 33 (connected via SCSI bus SB-2 16 to host 13). Region R-5 65 has two drives, DR-4 34 (connected via SCSI bus SB-2 16 to host 13) and DR-5 35 (connected via SCSI bus SB-1 15 to host 12). The pickers 21 and 22 run on the same side of the storage slots and drives and therefore collision avoidance must be practiced if each picker is allowed access to any storage slot and drive. A second set of storage slot regions may be provided on the opposite side of the library.

In accordance with one embodiment of the invention, collisions may be avoided by temporarily confining each picker to specific regions based on the jobs selected for the pickers. The library controller 11 arranges each of the commands in a queue and recognizes where the pickers are located, where the data storage media identified in the commands are located, and manages the queue to select appropriate jobs from the queue in the most efficient order, or delaying certain jobs to allow execution of other jobs in the most efficient way.

FIGS. 7, 8A and 8B illustrate exemplary sets of commands for jobs which are arranged in the queue in the order received, or in a priority order. The jobs relate to the arrangement of the library as represented in FIGS. 1, 5 and 6. The library controller 11 includes a table illustrated in FIG. 9 which correlates each of the data storage media in the library with its storage slot location 70, the X-Y location in the library of each drive 71, the X-Y location of the current position of each picker 72, and each of the data storage media in the input/output slots with its slot location 73. This table is updated each time a data storage media is accessed and each time a data storage media is stored, and each time a picker is moved. Thus, the library controller is able to identify the storage slot of the data storage media from the received command, determine the location of any media in a drive, and the current position of the pickers. This information is used in conjunction with the command job queue contents to schedule picker moves. Preferably, the storage slot identifiers are in an order such that the region, or column, may be easily identified from the storage slot identifier.

Referring to FIG. 7, a scenario is illustrated of an exemplary set of commands for jobs from the hosts arranged either in the order of receipt or in priority order. The execution of the queued jobs are conducted by the library manager 11 in accordance with the most efficient order utilizing both pickers 21 and 22 without conflict.

Assume that picker P1 21 and picker P2 22 become available. Job-1 is a cartridge move from Region 4 64 to a drive in Region 5 65 and Job-2 is a cartridge move from Region 4 to a drive in Region 4. The controller 11 therefore selects picker P2 for both tasks, using both grippers on the picker 22. Picker P2 was selected because, if picker P1 was selected, picker P2 would have to be moved to the garage G2 58 to prevent interference. Next the controller 11 analyzes the queue looking for a task for picker P1 21. Since jobs 3, 4 and 6 would result in picker interference, Job-5 is selected. If there were other jobs in the queue which would not result in picker interference with picker P2, they would be selected in order of receipt or priority.

Referring to FIGS. 8A and 8B, a scenario is illustrated of an exemplary set of commands for jobs from the hosts arranged in the order of receipt. In FIG. 8A, the priorities are equal, and, in FIG. 8B one job is high priority of "1". The execution of the queued jobs with equal priority are conducted by the library manager 11, delaying some picker movement in order to accomplish the most efficient utilization of both pickers 21 and 22 without conflict.

Assume that both pickers are available. Referring to FIG. 8A, the controller chooses picker P1 21 for Job-5 which is an exchange at Drive-1 31 in Region-1, chooses picker P2 for Job-2 which is a move command from Region-4 to Drive-3 and delays Job-1, which is first in the queue, to maximize performance. Jobs 1,2 and 4 were not selected for P1 because this area of the library is normally occupied by P2. Further, Job-1 was not selected because Job-1 would prevent picker P1 from doing Job-3 or Job-5 due to picker interference. Job-6 was not selected because it interferes with Jobs 1,2,3,4 and 5. Next, picker P1 is selected to do Job-3, which is a move from Region-3 to Drive-2, and Job-4 is scheduled for picker P2, which is a move from Drive-4 in Region-5 to garage G2. Thus performance can be maximized and a collision can be avoided by delaying Job-1. Now that picker P2 is in the garage, picker P1 can execute Job-6. As new jobs are added to the queue, an opportunity to execute Job-1 in parallel with another job may arise.

As the result of this queue management, each picker is, for a window of time, confined to a set of regions made up of data storage media and drives with at least one buffer region between them. At that point, active collision avoidance is to be practiced by not permitting either picker to enter the buffer region.

Another method of collision avoidance is to move one picker into its garage. A garage is large enough so that a buffer region is not needed. This allows the second picker to have access to all data storage media and drives in the library, with two exceptions, namely, if there are data storage media in the I/O station or the media cleaning cartridges are stored in the picker's home garage.

An example showing collision avoidance using delay in a priority situation is illustrated in FIG. 8B. Assume Job-6 is new to the queue and is a high priority job. In this situation, jobs allocated to P1 and P2 are completed. The controller then moves picker P2 into the garage G2. Picker P1 is then selected to conduct the Job-6, an exchange at Drive-1 in Region-1 from the source storage slot in Region-5 and destination storage slot in Region-2.

Another method for collision avoidance is to use virtual drives/pickers, and use any drive with either host. Thus, the controller 11 only selects the picker associated with the data storage media and delivers it to the closest drive.

In accordance with the present invention, the pickers may be allowed to roam throughout the entire library, including any columns, called "dancing pickers".

Figures 9, 10:
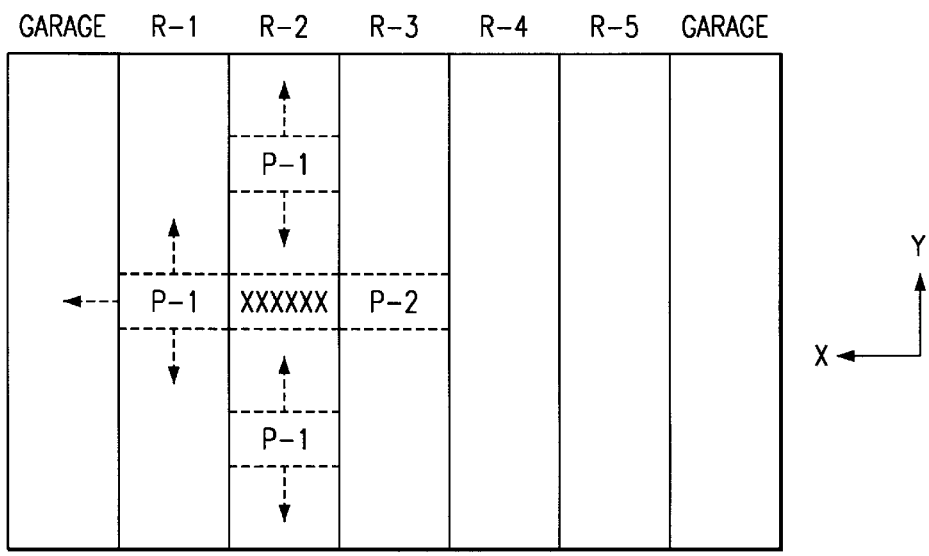
FIG. 9 is a table depicting the identification of the status of the automated data storage library of FIG. 1.
FIG. 10 is a diagrammatic representation of the operation of the automated data storage library of FIG. 1.

With reference to FIG. 10, assumptions for the library include that two robot pickers share a common shuttle or set of rails, with independent horizontal and vertical-movement motors, and each with a garage in opposite, outside regions. An additional assumption is that the pickers are wider than an individual region and thus protrude into the adjacent region. However, the pickers are each less than two regions wide. In many library environments, the picker may be thicker than a row. For such libraries, the picker is assumed to occupy a row set, which is a number of rows, including a row which a picker may access and a number of rows above and below that row. In the following description, the X location is a region, and the Y location is the row which would be accessed by a picker. The row set is denominated by the Y location and may extend a number of rows above and below the Y location row. For a library in which the picker is not more than one row thick, the row set is only the Y location row. An active picker is defined as moving in the X-Y direction to conduct media movement activity. The picker may be moved in both directions X and Y simultaneously or independently to conduct media movement activity.

The following are picker space-occupation rules:
1. The left picker P1 cannot be to the right of the right picker P2.
2. The right picker P2 cannot be to the left of the left picker P1.
3. The pickers cannot occupy the same region at the same time.
4. Because the pickers are wider than a region, pickers can occupy adjacent regions only if pickers are not in the same row set (unless one picker is in its garage).
5. The pickers can occupy nonadjacent regions in any row set.

The following are rules for deciding if an inactive picker is in an active picker's way:
If:
1. The inactive picker is in its garage, or
2. The active picker's destination region is at least two regions to its side of the inactive picker's current region, or
3. The active picker's destination region is adjacent to and on its side of the inactive picker's current region, and
   a. active picker's destination row set is below inactive picker, and active picker's current row set is below inactive picker, or
   b. active picker's destination row set is above inactive picker, and active picker's current row set is above inactive picker, then, the inactive picker is not in the active picker's way.

The following are rules for moving an inactive picker out of an active picker's way:
1. Start the inactive picker moving horizontally two regions past the active picker's destination storage slot or drive in the direction away from the active picker or to its garage.
2. If:
   a. the pickers are in adjacent regions, and
   b. active picker's vertical path will meet or cross the inactive picker's row set, delay moving the active picker one region travel time during which the inactive picker will move one region away.
3. Start active picker moving to its destination (for all active picker movements involving horizontal "X" movement, move horizontally at least one region before beginning any vertical movement to avoid clipping the other picker).

The following "dancing picker" rules relate to moving the pickers while both pickers are active (a simpler set of rules may be used if the pickers are only a single region in width):
1. If the other active picker is moving toward this currently inactive picker, then if
   a. This picker's destination storage slot or drive is at least two regions to its side of the other picker's destination storage slot or drive, or
   b. This picker's destination storage slot is one region to its side of (adjacent to) the other picker's destination storage slot, and if
      1) this picker and its destination row set are below (above) the other picker's destination row set, and
      2) the other picker is above (below) or at its destination row set, move this picker to its destination.
   Else, wait for the other picker to become inactive and then apply one "picker inactive" rules, above.
2. Else the other picker is moving away from this picker. If,
   a. This picker's destination storage slot is at least two regions to its side of the other picker's destination storage slot, and
   b. This picker is at least two regions to its side of the other picker, move this picker to its destination storage slot.
   Else if,
   a. This picker's destination storage slot is at least two regions to its side of the other picker's destination storage slot, and
   b. This picker's region is adjacent to the other picker's region, delay one region travel time while the other picker moves away and then move this picker to its destination storage slot.
   Else if,
   a. This picker's destination region is adjacent and to its side of the other picker's destination region, and if
      1) this picker's destination storage slot row set is below (above) the other picker's destination storage slot row set, and
      2) this picker is below (above) or at its destination storage slot row set, and
      3) this picker is below (above) the other picker, move this picker to its destination.
   Else move this picker to the storage slot to this side of its destination storage slot, and wait for the other picker to become inactive before completing its move.
   Else if,
   a. the other picker destination storage slot is at least three regions from this picker's current side of the library, move this picker to a storage slot that is two regions to its side of the other picker's destination and wait for the other picker to become inactive before completing this picker's move. (If the pickers are currently in adjacent regions, first delay one region travel time.)
   Else, wait for the other picker to become inactive. Other similar algorithms may be utilized in accordance with the present invention to control the allocation of the queued commands to the pickers and allocating the order of jobs to operate the "dancing pickers" that accomplish moving the pickers to avoid collision.

Figure 11:
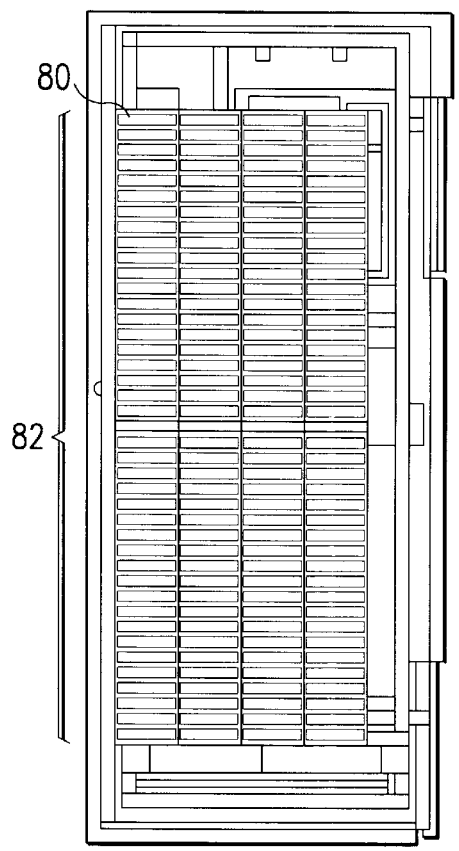
FIG. 11 is an illustration of an alternative embodiment of four regions of the automated data storage library of FIG. 1.

FIG. 11 illustrates an alternative horizontal arrangement of storage slots 80. The horizontal storage slots are sufficiently wide that a column 82 may be considered a region in accordance with the present invention. The height of the storage slots 80 are such that two or more slots may comprise a row set. The advantage of horizontal storage slots 80 is that data storage drives are typically horizontal so that the picker gripper does not pivot the data storage media, as is required between the vertical storage slots of FIG. 2 and the horizontal drive.

Figure 12:
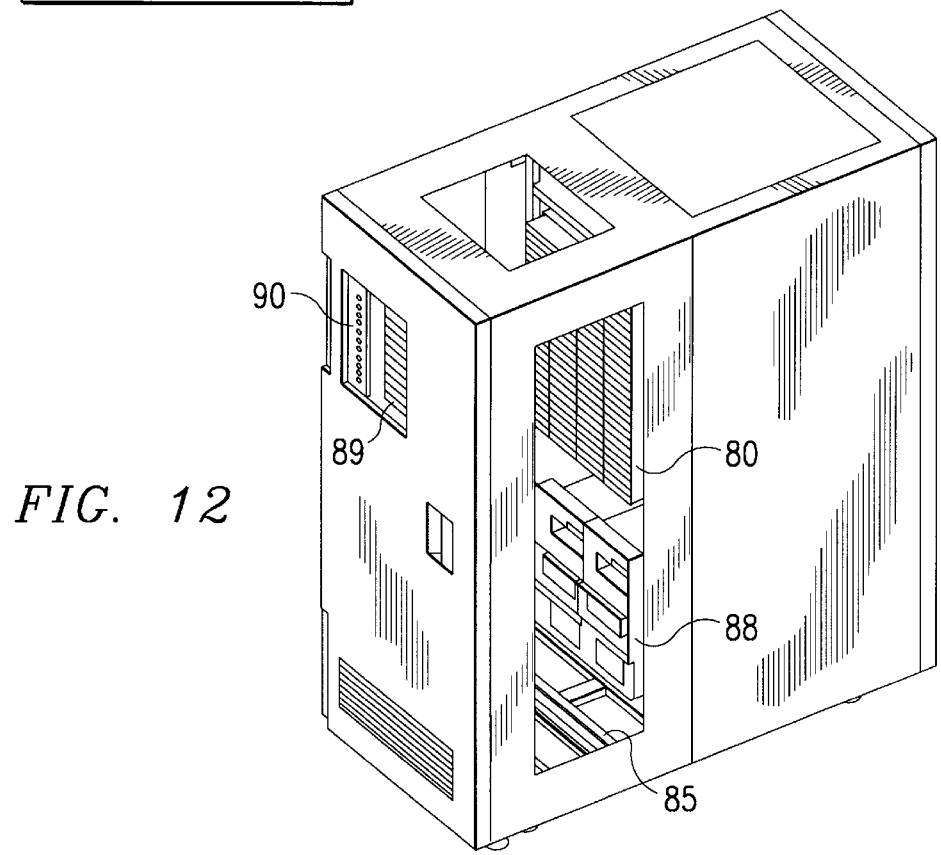
FIG. 12 is an illustration of an alternative embodiment of an automated data storage library of the present invention.

The present invention is also applicable to small multi-actuator automated data storage libraries, such as that illustrated in FIG. 12. Pickers mounted on common rail 85 move data storage media between storage slots 80, data storage drives 88 and input/output station 89. In the example, the input/output station is considered a region. An operator panel 90 indicates the status of the input/output station. The garage areas are at the ends of rail 85 (not illustrated).

The preferred embodiments have been illustrated as a planar arrangement of storage slots and drives with a straight guideway, but the invention is equally applicable to dual pickers mounted at a common pivot axis to access a cylindrical arrangement of storage slots. The two pickers may be located on a vertical rail with garages respectively on the top and the bottom. Thus, the present references to the Y direction, to columns and to regions, would instead mean the cylindrical horizontal sections of the library. Similarly, the present references to the X direction, to rows and row sets, would instead mean the vertical sections parallel to the axis of the cylinder of the library.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for operating an automated data storage library, said library having two pickers arranged on a common guideway, a plurality of regions, said regions comprising columns of media storage slots, at least one of said regions comprising at least one read/write station, said regions arranged in sequence alongside said guideway, said library receiving input commands for jobs to move media amongst said storage slots and said read/write stations, said method comprising the steps of:

queuing said received input commands in a job queue; and, allocating said input commands of said job queue alternately to each of said pickers and in an order of jobs which will allow said pickers to independently access and move said media so as to avoid interference by occupying the same said region, or occupying said regions which, in said sequence, are behind the other picker.

2. The method of claim 1, wherein said step of allocating said queued commands additionally comprises the steps of:

determining the regions of said library occupied by one of said pickers when executing the next queued command;

selecting the next command for said other picker from said queued commands for said other picker which operates said other picker to occupy said same region, or to occupy regions behind said one picker; and delaying said next queued command for said one picker until after completion by said other picker of said next command for said other picker.

3. The method of claim 2, wherein said delaying step additionally comprises moving said one picker out of any region to be occupied by said other picker during execution of said next command for said other picker.

4. A method for operating an automated data storage library having two pickers arranged on a common guideway, a plurality of regions, said regions comprising columns of row sets of media storage slots, at least one of said regions comprising at least one read/write station, said regions arranged in sequence alongside said guideway, said regions narrower than each of said pickers, such that when one of said pickers occupies one said region, said one picker additionally occupies at least one said row set of an adjacent said region toward the other of said pickers, said library receiving input commands for jobs to move media amongst said storage slots and said read/write stations, said method comprising the steps of:

queuing said received input commands in a job queue; and allocating said input command s of said job queue alternately to each of said pickers and in an order of jobs which will allow said pickers to independently access and move said media so as to avoid interference by occupying the same row set in adjacent said regions of said sequence, occupying the same said region, or occupying said regions which, in said sequence, are behind the other picker.

5. The method of claim 4, wherein said allocating step comprises the steps of:

determining the row sets and regions of said library occupied by one of said pickers when executing a presently allocated command; and selecting the next command for said other picker in said order of jobs based on jobs other than those of said queued commands operating said other picker to occupy the same row set as said one picker in said adjacent said regions, to occupy the same said region as said one picker, or to occupy said regions which, in said sequence, are behind said one picker.

6. The method of claim wherein said step of allocating said queued commands additionally comprises the steps of:

determining the regions and row sets of said library occupied by one of said pickers when executing the next queued command;

selecting the next command for said other picker from said queued commands for said other picker which operates said other picker to occupy said same region, or to occupy regions behind said one picker; and delaying said next queued command for said one picker until after completion by said other picker of said next command for said other picker.

7. The method of claim 6, wherein said delaying step additionally comprises moving said one picker out of any row set or region to be occupied by said other picker during execution of said next command for said other picker.

8. An automated data storage library, comprising:

a guideway;

two pickers arranged on said guideway;

a plurality of regions, said regions comprising columns of media storage slots, at least one of said regions comprising at least on read/write station, said regions arranged in sequence alongside said guideway;

an input receiving commands for jobs to move media amongst said storage slots and said read/write stations; and a controller having a job queue, for queuing said received input commands in said job queue and allocating said input commands of said job queue alternately to each of said pickers and in an order of jobs which will allow said pickers to independently access and move said media so as to avoid interference by occupying the same said region, or occupying said regions which, in said sequence, are behind the other picker.

9. The automated data storage library of claim 8, wherein said controller determines the regions of said library occupied by one of said pickers when executing the next queued command, selects the next command for said other picker from said queued commands for said other picker which operates said other picker to occupy said same region, or to occupy regions behind said one picker, and delays said next queued command for said one picker until after completion by said other picker of said next command for said other picker.

10. The automated data storage library of claim 9, wherein said controller additionally moves said one picker out of any region to be occupied by said other picker during execution of said next command for said other picker.

11. An automated data storage library, comprising:

a guideway;

two pickers arranged on said guideway;

a plurality of regions, said regions comprising columns of row sets of media storage slots, at least one of said regions comprising at least one read/write station, said regions arranged in sequence alongside said guideway, said regions narrower than each of said pickers, such that when one of said pickers is in one said region, said one picker additionally occupies at least one said row set of an adjacent said region toward the other of said pickers;

said guideway;

an input receiving commands for jobs to move media amongst said storage slots and said read/write stations; and a controller having a job queue, for queuing said received input commands in said job queue and allocating said input commands of said job queue alternately to each of said pickers and in an order of jobs which will allow said pickers to independently access and move said media so as to avoid interference by occupying the same row set in adjacent said regions of said sequence, occupying the same said region, or occupying said regions which, in said sequence, are behind the other picker.

12. The automated data storage library of claim 11, wherein said controller determines the row sets and regions of said library occupied by one of said pickers when executing a presently a located command and selects the next command for said other picker from said job queue in said order of jobs based on jobs other than those of said queued commands operating said other picker to occupy the same row set as said one picker in said adjacent said regions, to occupy the same said region as said one picker, or to occupy said regions which, in said sequence, are behind said one picker.

13. The automated data storage library of claim 12, wherein said controller additionally determines the regions and row sets of said library occupied by one of said pickers when executing the next queued command, selects the next command for said other picker from said queued commands for said other picker which operates said other picker to occupy said same region, or to occupy regions behind said one picker, and delays said next queued command for said one picker until after completion by said other picker of said next command for said other picker.

14. The automated data storage library of claim 13, wherein said controller additionally moves said one picker out of any row set or region to be occupied by said other picker during execution of said next command for said other picker.

* * * * *